US012119588B2

(12) United States Patent
Asano et al.

(10) Patent No.: US 12,119,588 B2
(45) Date of Patent: Oct. 15, 2024

(54) LEVER-TYPE CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yasunori Asano, Mie (JP); Daisuke Saito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 273 days.

(21) Appl. No.: 17/764,947

(22) PCT Filed: Aug. 21, 2020

(86) PCT No.: PCT/JP2020/031610
§ 371 (c)(1),
(2) Date: Mar. 29, 2022

(87) PCT Pub. No.: WO2021/075149
PCT Pub. Date: Apr. 22, 2021

(65) Prior Publication Data

US 2022/0368073 A1 Nov. 17, 2022

(30) Foreign Application Priority Data

Oct. 18, 2019 (JP) ................................ 2019-190861

(51) Int. Cl.
*H01R 13/629* (2006.01)

(52) U.S. Cl.
CPC . *H01R 13/62938* (2013.01); *H01R 13/62966* (2013.01); *H01R 13/62977* (2013.01)

(58) Field of Classification Search
CPC ........ H01R 13/62938; H01R 13/62922; H01R 13/62966; H01R 13/62977
(Continued)

(56) References Cited

U.S. PATENT DOCUMENTS 6,345,995 B1 * 2/2002 Bigotto ............ H01R 13/62977 439/372
7,070,438 B2 * 7/2006 Dillon .............. H01R 13/62977 439/372
(Continued)

FOREIGN PATENT DOCUMENTS

JP 2007-005088 A 1/2007
JP 2010-244799 A 10/2010
(Continued)

OTHER PUBLICATIONS

International Search Report issued on Oct. 27, 2020 for WO 2021/075149 A1 (4 pages).

*Primary Examiner* — Marcus E Harcum
(74) *Attorney, Agent, or Firm* — Venjuris, P.C.

(57) ABSTRACT

A lever-type connector includes a housing configured to rotate about a first shaft, a second lever configured to rotate about a second shaft and a cam groove linked with rotation of the second lever. The first lever includes a guide portion extending from an operating portion toward the first shaft, and the second lever includes a coupling portion coupled to the first lever relatively displaceably along the guide portion. The both levers are linked and rotated between an initial position where connection of the housing and a mating housing is started and a connection position where the connection of the housing and the mating housing is completed. When a virtual line passing through the second shaft
(Continued)

and the coupling portion with the second lever located at the initial position is set, the first shaft is located closer to the connection position than the virtual line.

5 Claims, 6 Drawing Sheets

(58) Field of Classification Search
USPC .......................................... 439/372, 347, 157
See application file for complete search history.

(56) References Cited

U.S. PATENT DOCUMENTS

| | | | | |
|---|---|---|---|---|
| 7,568,925 | B2 * | 8/2009 | Ciriello ............ | H01R 13/62977 439/157 |
| 7,789,682 | B1 * | 9/2010 | Hitchcock ........ | H01R 13/62922 439/372 |
| 7,862,353 | B1 * | 1/2011 | Azad ................ | H01R 13/62966 439/372 |
| 8,057,245 | B2 * | 11/2011 | Sakamaki ........ | H01R 13/62933 439/157 |
| 10,873,156 | B2 * | 12/2020 | Shibata ............ | H01R 13/62933 |
| 11,336,055 | B2 * | 5/2022 | Kropiewnicki .. | H01R 13/62955 |
| 2002/0101091 | A1 * | 8/2002 | Ito ....................... | B60R 11/0235 296/37.12 |
| 2005/0221647 | A1 | 10/2005 | Dillon et al. | |

FOREIGN PATENT DOCUMENTS

| | | | |
|---|---|---|---|
| JP | 2012-164599 | A | 8/2012 |
| JP | 2013-004419 | A | 1/2013 |

* cited by examiner

LEVER-TYPE CONNECTOR

CROSS REFERENCE TO RELATED APPLICATIONS

This application is a national phase of PCT application No. PCT/JP2020/031610, filed on 21 Aug. 2020, which claims priority from Japanese patent application No. 2019-190861, filed on 18 Oct. 2019, all of which are incorporated herein by reference.

TECHNICAL FIELD

The present disclosure relates to a lever-type connector.

BACKGROUND

Patent Document 1 discloses a lever connection type connector in which a rotatable lever is mounted on a connector housing. In connecting this lever connection type connector and a mating connector, the lever is rotated with a follower pin of the mating connector inserted in a cam hole of the lever. When the lever is operated to cause the cam hole and the follower pin to slide in contact with each other, a boosting effect is exhibited by lever action, and the lever connection type connector and the mating connector are connected.

PRIOR ART DOCUMENT

Patent Document

Patent Document 1: JP 2012-164599 A

SUMMARY OF THE INVENTION

Problems to be Solved

To reduce an operation force applied to the lever, a large length from a fulcrum to an operating portion of the lever may be ensured. However, if the length from the fulcrum to the operating portion of the lever is made longer, the lever connection-type connector is enlarged.

A lever-type connector of the present disclosure was completed on the basis of the above situation and aims to reduce an operation force without enlargement.

Means to Solve the Problem

The present disclosure is directed to a lever-type connector with a housing, a first lever mounted on the housing rotatably about a first shaft, a second lever mounted on the housing rotatably about a second shaft, and a boosting portion for exhibiting a boosting function by being linked with rotation of the second lever, wherein the first lever includes a guide portion extending from an operating portion of the first lever toward the first shaft, the second lever includes a coupling portion coupled to the first lever relatively displaceably along the guide portion, the first and second levers are linked and rotatable between an initial position where connection of the housing and a mating housing is started and a connection position where the connection of the housing and the mating housing is completed, and the first shaft is located closer to the connection position than a virtual line when the virtual line passing through the second shaft and the coupling portion with the second lever located at the initial position is set.

Effect of the Invention

According to the present disclosure, it is possible to reduce an operation force without enlargement.

DETAILED DESCRIPTION TO EXECUTE THE INVENTION

Description of Embodiments of Present Disclosure

Figure 1:
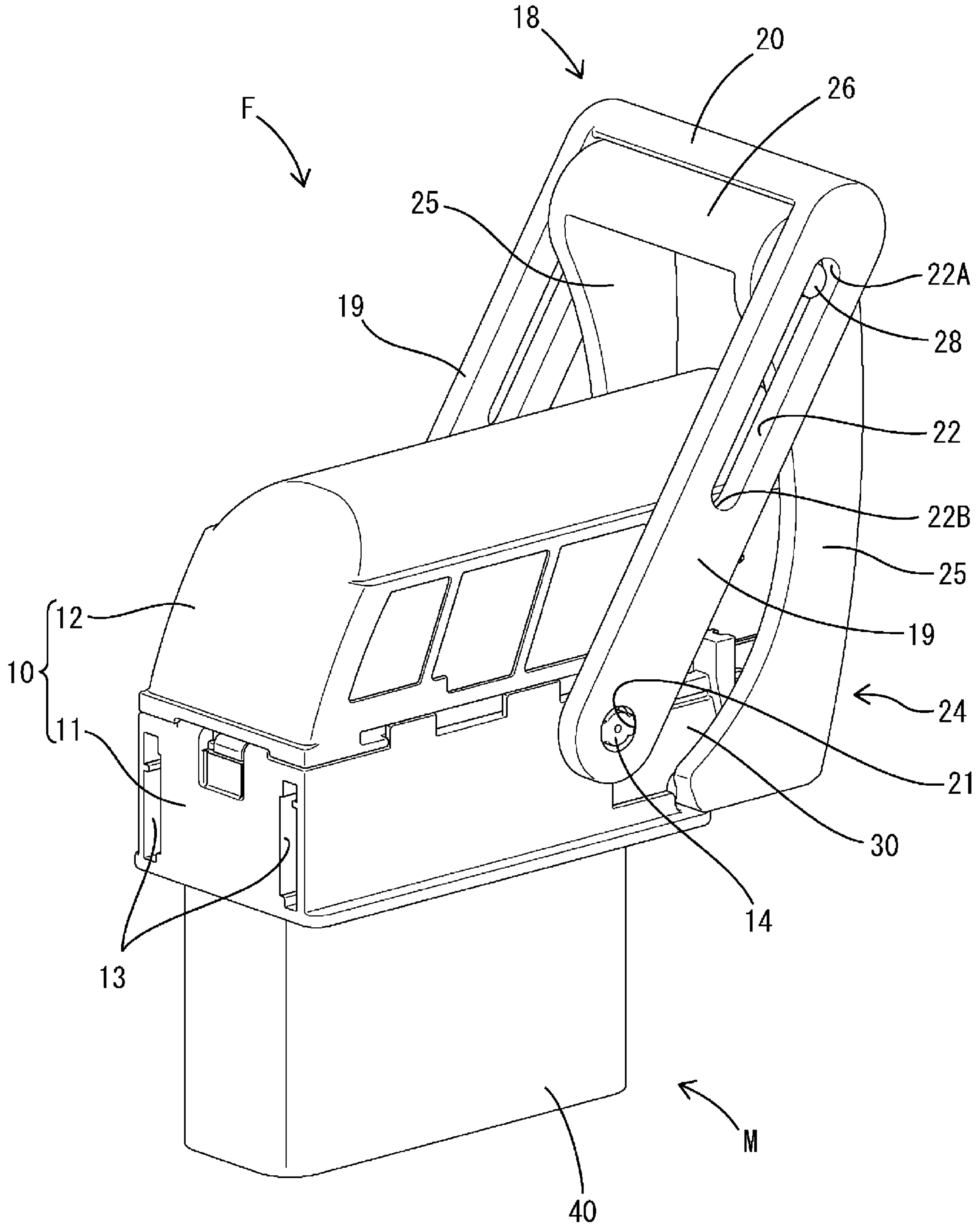
FIG. 1 is a perspective view showing a state where the connection of a lever-type connector of one embodiment and a mating connector is started.

First, embodiments of the present disclosure are listed and described.

(1) The lever-type connector of the present disclosure includes a housing, a first lever mounted on the housing rotatably about a first shaft, a second lever mounted on the housing rotatably about a second shaft, and a boosting portion for exhibiting a boosting function by being linked with rotation of the second lever, wherein the first lever includes a guide portion extending from an operating portion of the first lever toward the first shaft, the second lever includes a coupling portion coupled to the first lever relatively displaceably along the guide portion, the first and second levers are linked and rotatable between an initial position where connection of the housing and a mating housing is started and a connection position where the connection of the housing and the mating housing is completed, and the first shaft is located closer to the connection position than a virtual line when the virtual line passing through the second shaft and the coupling portion with the second lever located at the initial position is set.

According to the configuration of the present disclosure, an operation force applied to the operating portion is transmitted to the second shaft via the coupling portion and the second lever, thereby exhibiting a boosting function, in the process of rotating the first and second levers from the initial position to the connection position. Since the coupling portion is relatively displaced from the side of the operating portion toward the first shaft along the guide portion during this time, the operating portion is displaced away from the second shaft. Therefore, an operation force necessary to rotate the second lever can be small. Since the first and second levers need not be lengthened, the operation force can be reduced without enlargement.

(2) Preferably, the coupling portion is arranged on a tip part of the second lever on a side opposite to the second shaft in a length direction. According to this configuration, the tip part of the second lever does not project from a side edge of the first lever in the process of linking and rotating the first and second levers.

(3) Preferably, the coupling portion is located on an operation side end part near the operating portion, out of both end parts in a length direction of the guide portion, with the first and second levers located at the initial position. According to this configuration, if an attempt is made to rotate the both levers at the initial position toward a side opposite to the connection position, the coupling portion butts against the operation side end part of the guide portion. In this way, it is possible to prevent the rotation of the both levers at the initial position toward the side opposite to the connection position.

(4) Preferably, the operating portion is located on a tip part of the first lever on a side opposite to the first shaft, out of both end parts in a length direction, and an operation side end part of the guide portion on a side opposite to the first shaft, out of both end parts in the length direction, is located adjacent to the operating portion. According to this configuration, when the both levers are at the initial position, a projecting dimension of the tip part of the first lever from a side edge of the second lever can be shortened.

(5) Preferably, the coupling portion is located on a straight line connecting the first shaft and the second shaft when a connection resistance generated in a connection process of the housing and the mating housing is maximum. According to this configuration, a direction of an operation force applied to the operating portion to rotate the first lever about the first shaft coincides with a rotating direction of the second lever about the second shaft. Therefore, the operation force applied to the operating portion is exhibited as a force for rotating the second lever without any loss.

DETAILS OF EMBODIMENT OF PRESENT DISCLOSURE

Embodiment

One specific embodiment of a lever-type connector F of the present disclosure is described below with reference to FIGS. 1 to 6. Note that the present invention is not limited to these illustrations and is intended to be represented by claims and include all changes in the scope of claims and in the meaning and scope of equivalents. In this embodiment, a left side in FIGS. 2 to 6 is defined as a front side concerning a front-rear direction. Upper and lower sides shown in FIGS. 1 to 6 are directly defined as upper and lower sides concerning a vertical direction.

Figure 5:
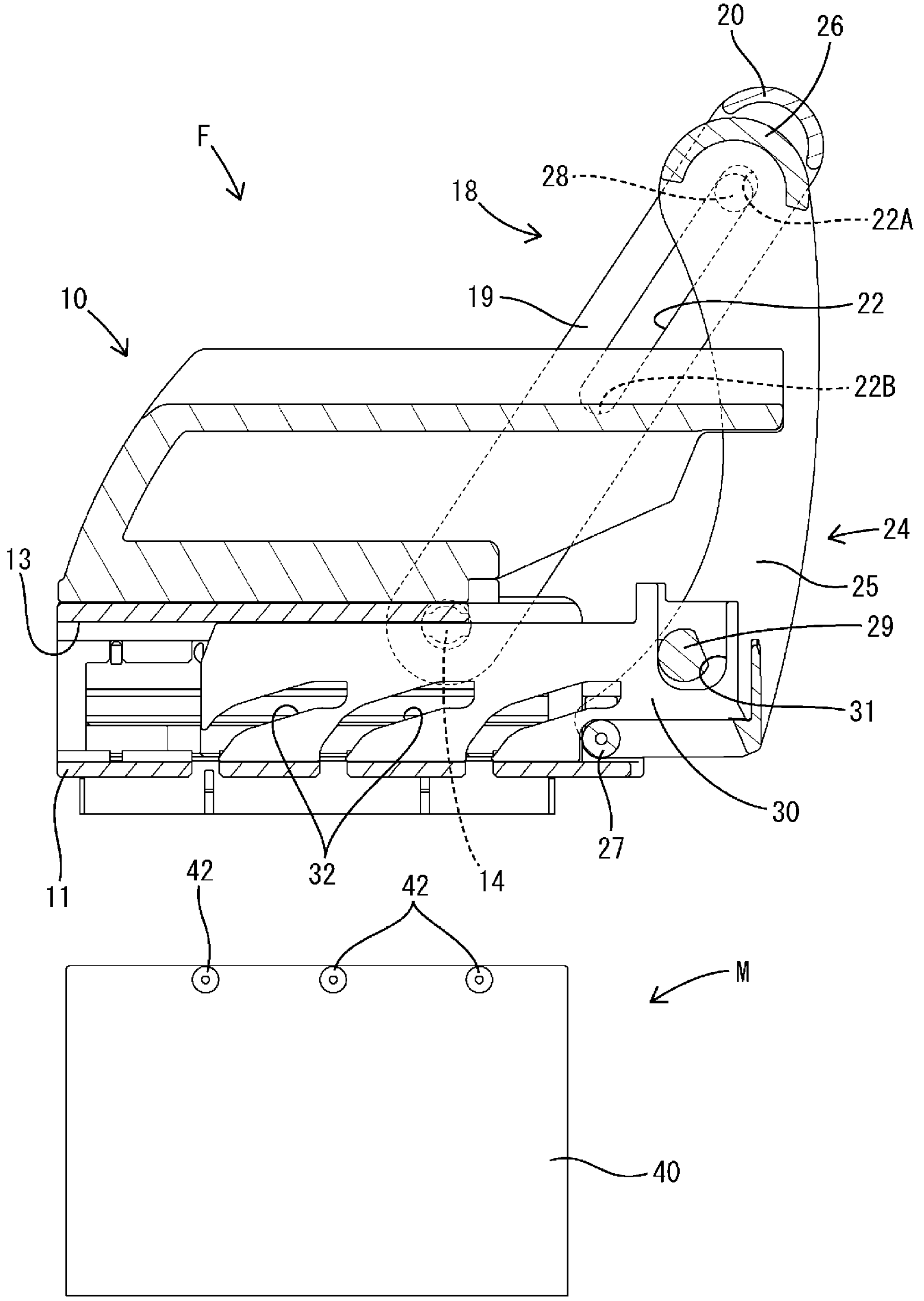
FIG. 5 is a side view in section showing a state where the first and second levers are at the initial position and the lever-type connector and the mating connector are separated.
Figure 6:
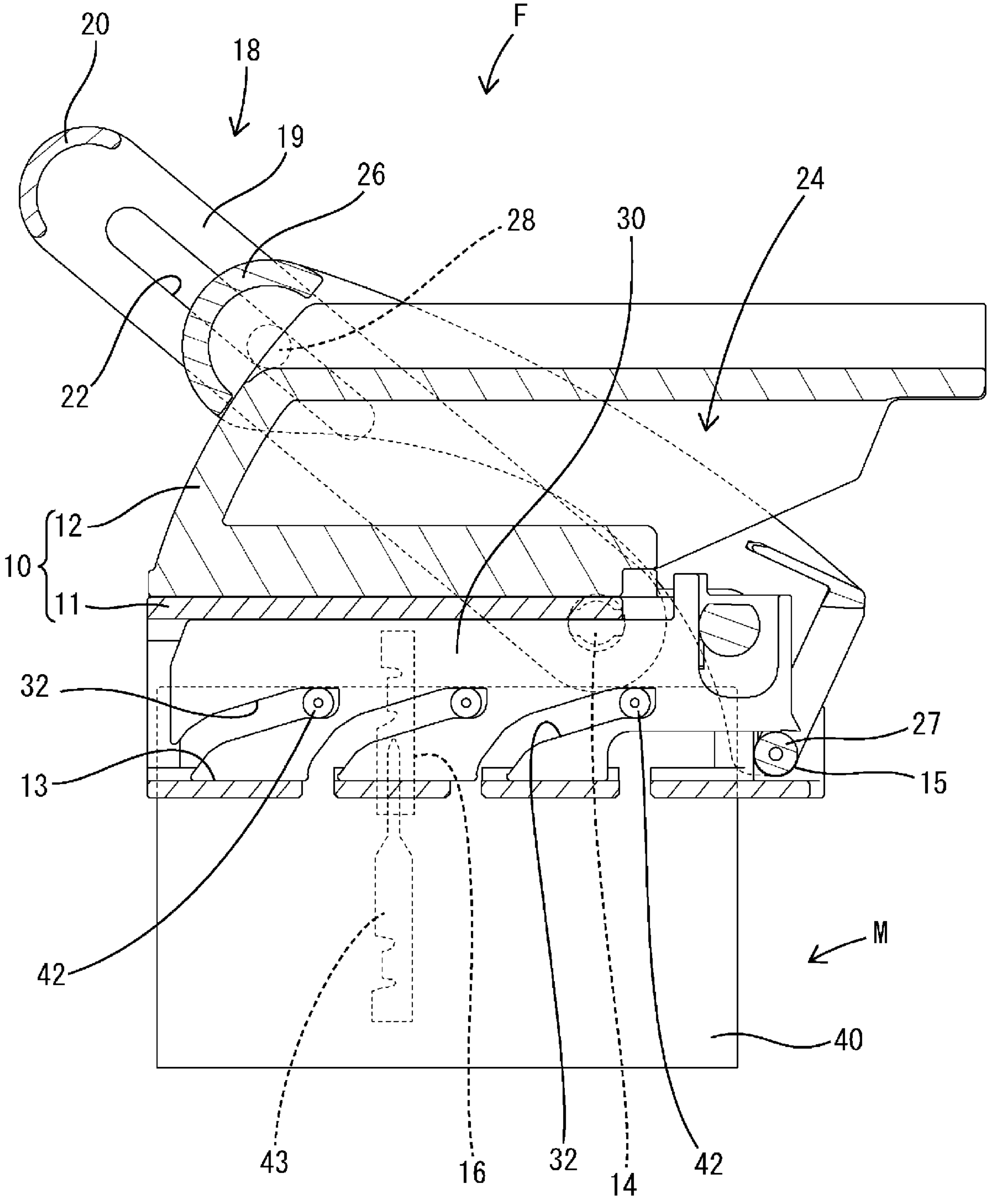
FIG. 6 is a side view in section showing a state where the first and second levers are at the connection position and the lever-type connector and the mating connector are connected.

The lever-type connector F of this embodiment is connected to a mating connector M by being brought closer to the mating connector M from above. The mating connector M includes a mating housing 40 and a plurality of male terminal fittings 43 (see FIG. 6) accommodated inside the mating housing 40. As shown in FIGS. 5 and 6, a plurality of (three in this embodiment) cam followers 42 are formed on each of both left and right outer side surfaces of the mating connector M while being spaced apart in the front-rear direction. The upper surface of the mating housing 40 serves as a connection surface facing the lever-type connector F.

The lever-type connector F includes one housing 10, a plurality of female terminal fittings 16 (see FIG. 6), one first lever 18, one second lever 24 and a pair of left and right sliders 30. The housing 10 has a two-component structure made by assembling a housing body 11 made of synthetic resin and a wire cover 12 made of synthetic resin. The plurality of female terminal fittings 16 are accommodated in the housing body 11. The lower surface of the housing body 11 serves as a connection surface vertically facing the connection surface of the mating connector M.

Wires (not shown) connected to the respective female terminal fittings 16 are drawn out upward from the upper surface of the housing body 11, i.e. an outer surface on a side opposite to a connecting direction to the mating housing 40. The wire cover 12 is mounted on the upper surface of the housing body 11. A plurality of the wires drawn out from the housing body 11 are turned to be bent rearward inside the wire cover 12. The turned wires are pulled out rearward to the outside of the wire cover 12.

As shown in FIGS. 5 and 6, a pair of left and right guide grooves 13 are formed inside the housing body 11. The guide grooves 13 are disposed along both left and right outer side surfaces of the housing body 11 and extend in the front-rear direction orthogonal to the connecting direction of the both connectors F, M. Both front and rear ends of the guide grooves 13 are open to the outside of the housing body 11.

A pair of first shafts 14 having axes oriented in a lateral direction, i.e. in a direction orthogonal to the connecting direction of the both connectors F, M are coaxially formed on the both left and right outer side surfaces of the housing body 11. In the front-rear direction, the first shaft 14 is arranged at a position forward of a center of the housing 10. In the vertical direction, the first shaft 14 is arranged above a center height of the housing body 11. A pair of bearing portions 15 (see FIG. 6) are formed on the both left and right outer side surfaces of the housing body 11. In the front-rear direction, the bearing portion 15 is arranged in a rear end part of the housing body 10, i.e. at a position rearward of the first shaft 14. In the vertical direction, the bearing portion 15 is arranged in a lower end part of the housing body 11, i.e. at a position below the first shaft 14. The bearing portion 15 is arranged at a position separated obliquely to a lower-rear side from the first shaft 14.

The first lever 18 is a single component including a pair of bilaterally symmetrical first arm portions 19 and an operating portion 20 coupling tip parts of the both first arm portions 19. Bearing holes 21 penetrating through the first arm portions 19 in the lateral direction are formed in base end parts of the first arm portions 19. The first lever 18 is mounted relatively rotatably with respect to the housing 10 by fitting the bearing holes 21 to the first shafts 14. With the first lever 18 mounted on the housing 10, the first arm portions 19 are located to overlap the outer side surfaces of the housing 10 across clearances in the lateral direction.

The first arm portion 19 is in the form of a linearly extending elongated plate. Each of the both left and right first arm portions 19 is formed with a guide portion 22 penetrating through the first arm portion 19 in the lateral direction. The guide portion 22 is in the form of a groove linearly extending in parallel to the first arm portion 19 from the side of the operating portion 20 toward the first shaft 14. The guide portion 22 is closed on an operation side end part 22A on a side near the operating portion 20 and on a shaft side end part 22B near the first shaft 14, out of both end parts in a length direction of the guide portion 22.

The second lever 24 is a single component including a pair of bilaterally symmetrical second arm portions 25 and a linking portion 26 coupling tip parts of the both second arm portions 25. A pair of second shafts 27 are formed on base end parts of the second arm portions 25. The pair of second shafts 27 project from the inner surfaces of the base end parts with axes thereof oriented in the lateral direction, and are arranged coaxially with each other. The second lever 24 is mounted relatively rotatably with respect to the housing 10 by fitting the second shafts 27 to the bearing portions 15. With the second lever 24 mounted on the housing 10, the second arm portions 25 are located to overlap the outer side surfaces of the housing 10 across clearances in the lateral direction and located to overlap the inner side surfaces of the first arm portions 19 across clearances in the lateral direction.

The second arm portion 25 has an elongated curved shape in a side view viewed in parallel to the axis of the second shaft 27. A pair of coupling portions 28 are formed on the tip parts of the pair of second arm portions 25. The pair of coupling portions 28 have a cylindrical shape having an axis oriented in the lateral direction, i.e. in a direction parallel to the first shafts 14 and the second shafts 27. The pair of coupling portions 28 project in the lateral direction from the outer side surfaces of the tip parts of the second arm portions 25. An outer diameter of the coupling portion 28 is equal to or slightly smaller than a width of the guide portion 22.

The both left and right second arm portions 25 are formed with a pair of drive shafts 29. The drive shaft 29 is arranged between a center of the second lever 24 and the second shaft 27 in a length direction of the second lever 24. That is, a length from the second shaft 27 to the drive shaft 29 is shorter than a length from the second shaft 27 to the coupling portion 28. The drive shaft 29 projects from the inner surface of the second arm portion 25 with an axis oriented in the lateral direction.

The first and second levers 18, 24 are coupled to be linked and rotatable while being relatively displaced by fitting the coupling portions 28 to the guide portions 22. The coupled first and second levers 18, 24 are rotated between an initial position shown in FIGS. 1, 2 and 5 and a connection position shown in FIGS. 4 and 6. When the first and second levers 18, 24 are linked and rotated, the first lever 18 rotates about the first shafts 14 and the second lever 24 rotates about the second shafts 27.

When the both levers 18, 24 are at the initial position, the first lever 18 is in a rearward leaning posture so that the operating portion 20 is located rearward of the first shafts 14 and the second shafts 27. The second lever 24 is in a rearward leaning posture so that the coupling portions 28 are located rearward of the second shafts 27. The coupling portions 28 are located at the operation side end parts 22A of the guide portions 22. The both levers 18, 24 at the initial position are displaced to the connection position by being rotated counterclockwise in a side view shown in FIGS. 2 to 6. With the both levers 18, 24 rotated to the connection position, the first lever 18 is in a forward leaning posture so that the operating portion 20 is located forward of the first shafts 14. The second lever 24 is in a forward leaning posture so that the coupling portions 28 are located forward of the first shafts 14 and the second shafts 27.

A line connecting the coupling portions 28 and the second shafts 27 with the both levers 18, 24 located at the initial position is defined as a virtual line V. In a side view viewed in parallel to the axes of the first shafts 14 and the second shafts 27, a front region, out of two front and rear regions divided by the virtual line V, is defined as a region on the connection position side. Out of the two front and rear regions divided by the virtual line V, the rear region is defined as a region on the initial position side. The region on the connection position side is a region in which the coupling portions 28 move when the second lever 24 at the initial position rotates toward the connection position. When the both levers 18, 24 are at the initial position, the first shafts 14 are located in a region closer to the connection position side than the virtual line V. The first shafts 14 are located inside a locus circle drawn by the coupling portions 28 according to the rotation of the second lever 24. The operating portion 20 is located outside the locus circle drawn by the coupling portions 28.

The pair of sliders 30 are mounted to be relatively displaceable in the front-rear direction in the guide grooves 13 of the housing body 11. A passive recess 31 is formed in a rear end part of the slider 30. As shown in FIGS. 5 and 6, the slider 30 is formed with a plurality of (three in this embodiment) cam grooves 32 functioning as a boosting portion. The cam groove 32 includes a groove portion extending in a direction oblique to both the connecting direction of the both connectors F, M and a moving direction of the slider 30. The entrance of the cam groove 32 is open on the lower end edge of the slider 30. The slider 30 is coupled to the second lever 24 by fitting the passive recess 31 to the drive shaft 29. The second lever 24 is relatively rotatable about the drive shafts 29 with respect to the sliders 30.

Figure 2:
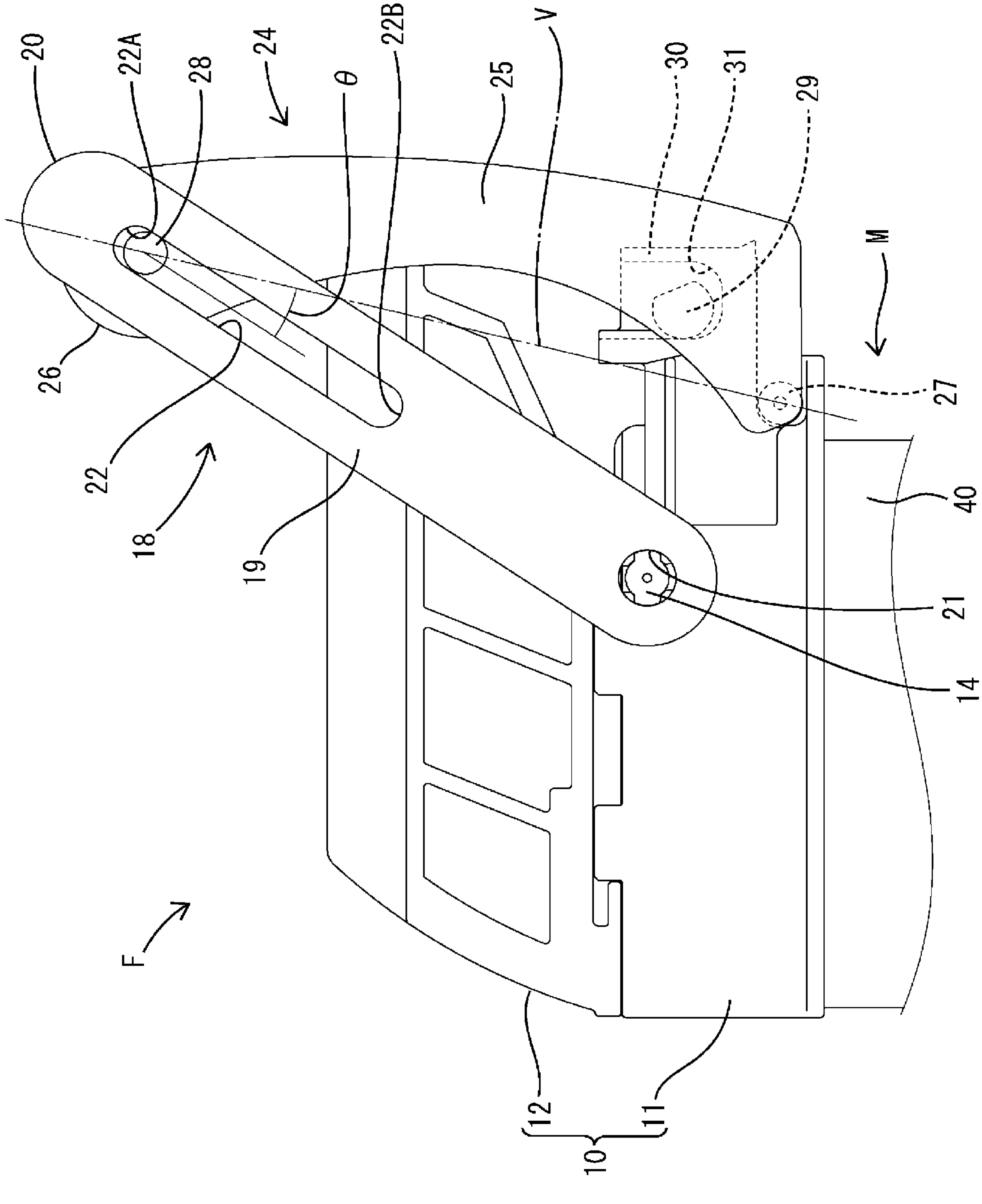
FIG. 2 is a side view showing a state where a first lever and a second lever are at an initial position.
Figure 3:
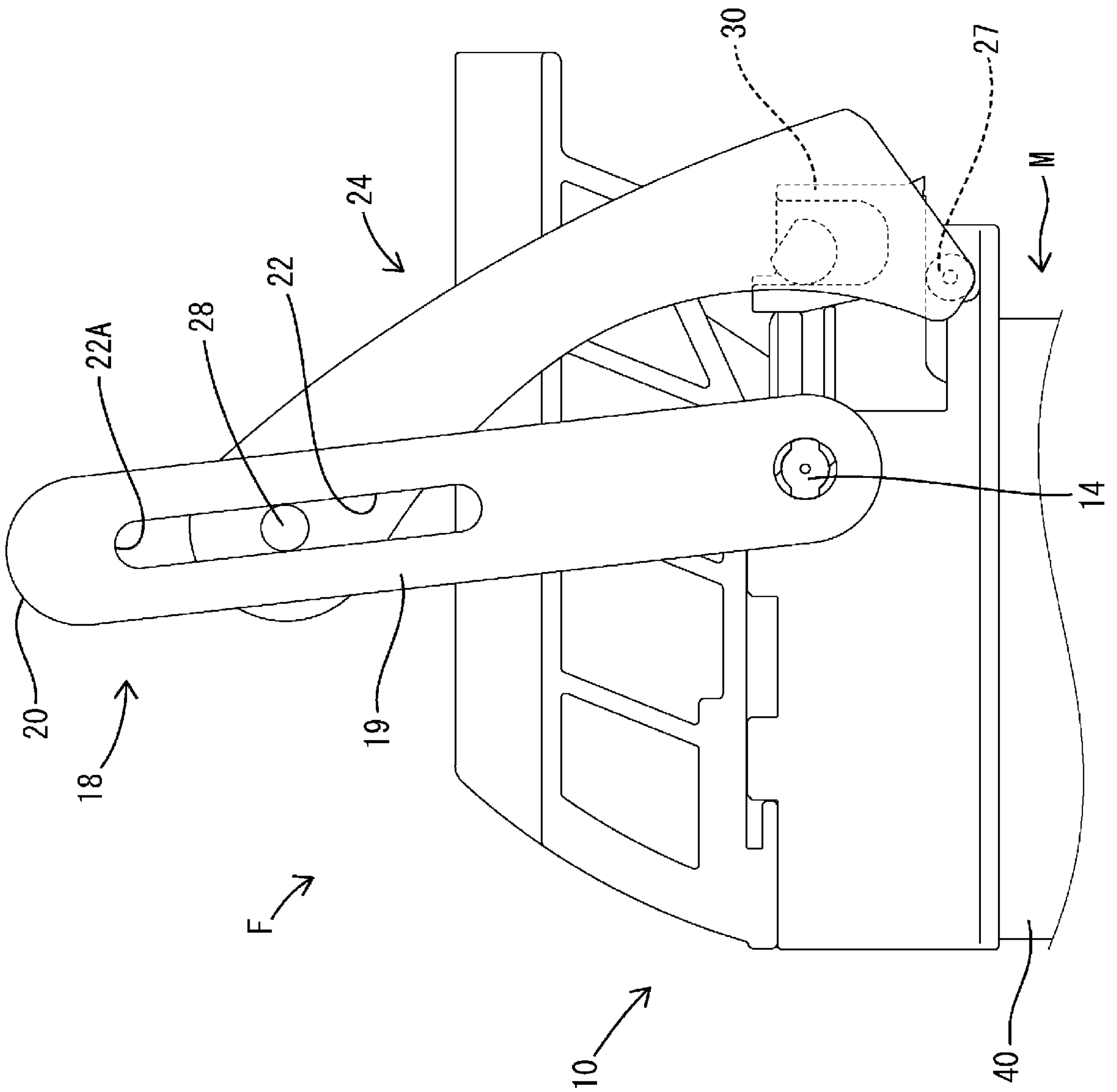
FIG. 3 is a side view showing a state where the first and second levers are located between the initial position and a connection position.
Figure 4:
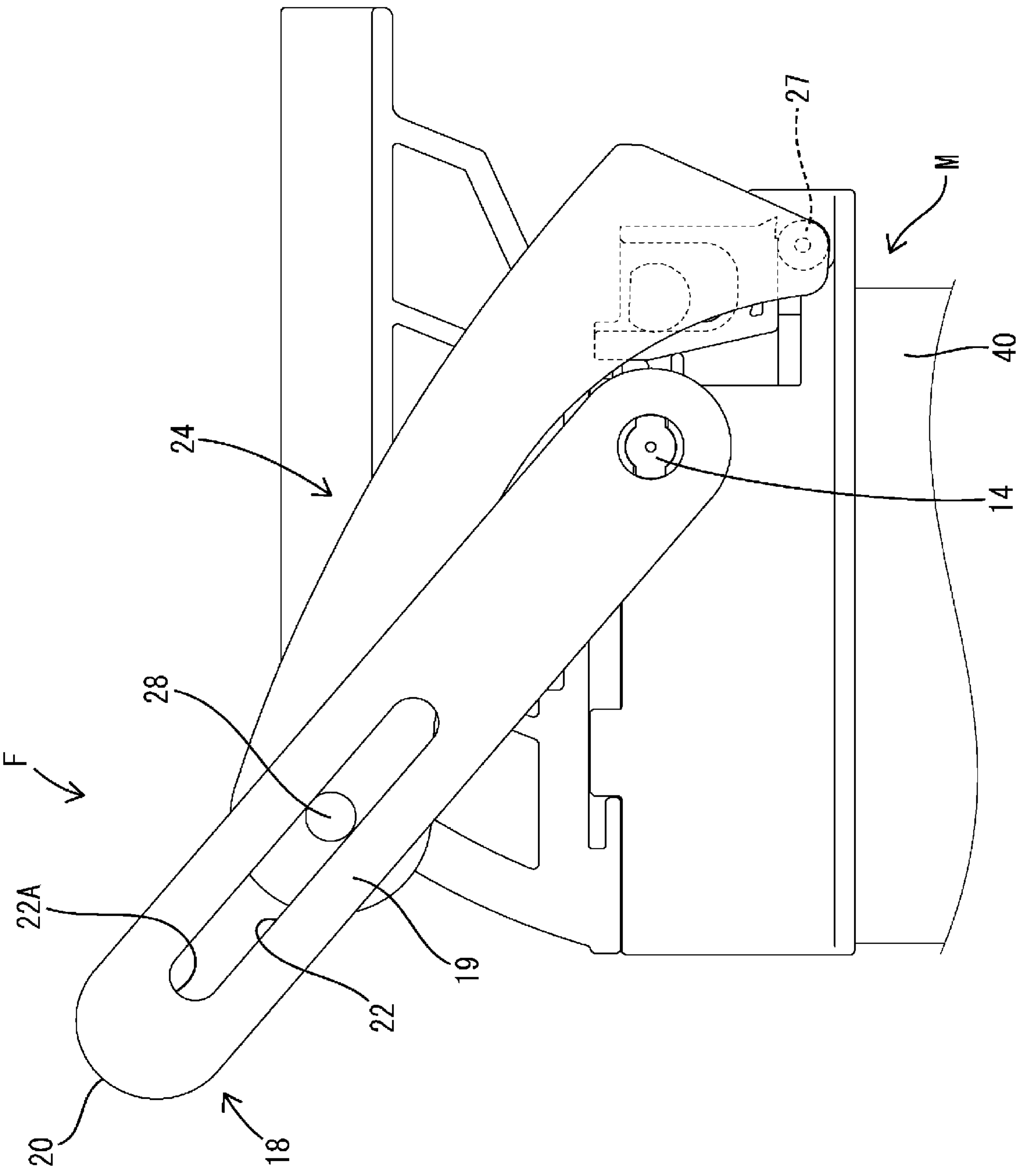
FIG. 4 is a side view showing a state where the first and second levers are at the connection position.

In connecting the lever-type connector F and the mating connector M, the mating housing 40 is lightly fit to the housing 10 as shown in FIG. 2 from a state where the both levers 18, 24 are displaced to the initial position as shown in FIG. 5. When the both housings 10, 40 are lightly fit, the cam followers 42 enter the entrances of the cam grooves 32. From this state, an operation force is applied to the operating portion 20 of the first lever 18 to rotate the both levers 18, 24 toward the connection position. A direction of the operation force applied to the operating portion 20 is a length direction of the first lever 18, i.e. a direction perpendicular to a direction connecting the first shafts 14 and the operating portion 20.

In the process of rotating the both levers 18, 24, an operation force applied to the operating portion 20 of the first lever 18 is transmitted as a rotational force to the second lever 24 via the guide portions 22 and the coupling portions 28. Since the first shafts 14 are arranged closer to the connection position than the virtual line V, the coupling portions 28 are relatively displaced from the operation side end parts 22A toward the shaft side end parts 22B along the guide portions 22 in the process of rotating the both levers 18, 24 in the connecting direction. As the coupling portions 28 move toward the shaft side end parts 22B, the operating portion 20 is relatively displaced toward an outer peripheral side in a direction away from the locus circle (not shown) drawn about the second shafts 27 by the coupling portions 28. In this way, a distance from the second shafts 27 linked with the boosting function to the operating portion 20 serving as an application target of the operation force becomes longer, wherefore an operation force necessary to cause the cam grooves 32 to exhibit the boosting function is reduced.

Further, the coupling portions 28 are located in parts for transmitting the rotational force from the first lever 18 to the second lever 24. Thus, when the first lever 18 is a lever and the first shafts 14 serve as a fulcrum, the coupling portions

28 serve as a point of action of the lever. The operating portion 20 serves as a point of force and the position of the operating portion 20 does not change even if the first lever 18 is rotated. The coupling portions 28 serving as the point of action approach the first shafts 14 serving as the fulcrum of the lever as the both levers 18, 24 are rotated toward the connection position. Therefore, the boosting function when the operation force applied to the operating portion 20 is transmitted to the second lever 24 increases as the both levers 18, 24 are rotated more toward the connection position.

Further, in the process of rotating the first and second levers 18, 24 from the initial position to the connection position, the first and second levers 18, 24 relatively rotate about the coupling portions 28. As shown in FIG. 2, an angle θ between a half-line extending from the coupling portion 28 to the first shaft 14 and the virtual line V extending from the coupling portion 28 toward the second shaft 27 varies toward the connection position. As the angle θ between the both levers 18, 24 with the coupling portion 28 serving as a vertex becomes smaller, an angle between a direction of the operation force acting on the operating portion 20 and a rotating direction of the second lever 24 becomes smaller. The rotating direction of the second lever 24 is a direction perpendicular to the virtual line V connecting the second shaft 27 and the coupling portion 28.

The rotational force transmitted to the second lever 24 is transmitted to the sliders 30 via the drive shafts 29 and the passive recesses 31 and the sliders 30 slide forward. When the second lever 24 is a lever and the second shafts 27 serve as a fulcrum of the lever, the coupling portions 28 serve as a point of force of the lever and the drive shafts 29 serve as a point of action of the lever. Since a length from the second shaft 27 to the drive shaft 29 is shorter than a length from the second shaft 27 to the coupling portion 28, a drive force transmitted from the second lever 24 to the sliders 30 is amplified by the lever action.

When the sliders 30 slide, the cam followers 42 slide in contact with inner side edge parts of the cam grooves 32, whereby the mating housing 40 is pulled toward the housing 10 and the connection of the both connectors F, M proceeds. Since the boosting function is exhibited by the slide contact of the cam followers 42 and the cam grooves 32 during this time, the drive force to be applied from the second lever 24 to the sliders 30 can be small. When the both levers 18, 24 reach the connection position, the both connectors F, M are properly connected.

With the both levers 18, 24 located between the initial position and the connection position, the first shafts 14 are kept in such a state as to be located in the region closer to the connection position than the virtual line V connecting the second shafts 27 and the coupling portions 28. When the both levers 18, 24 reach the connection position, the first shafts 14, the second shafts 27 and the coupling portions 28 are arranged substantially along one straight line. This mode means that the direction of the operation force acting on the operating portion 20 and the rotating direction of the second lever 24 become substantially parallel. Therefore, the operation force applied to the operating portion 20 is directly transmitted as a drive force for rotating the second lever 24. In this embodiment, when the both levers 18, 24 reach the connection position, a connection resistance generated in the connection process of the housing 10 and the mating housing 40 becomes maximum.

The lever-type connector F of this embodiment includes the housing 10, the first lever 18, the second lever 24 and the cam grooves 32. The first lever 18 is mounted on the housing 10 rotatably about the first shafts 14. The second lever 24 is mounted on the housing 10 rotatably about the second shafts 27. The cam grooves 32 constitute the boosting portion for exhibiting the boosting function by being linked with the rotation of the second lever 24.

The first lever 18 includes the guide portions 22 extending from the operating portion 20 of the first lever 18 toward the first shafts 14. The second lever 24 includes the coupling portions 28 coupled to the first lever 18 relatively displaceably along the guide portions 22. By fitting the coupling portions 28 to the guide portions 22, the first and second levers 18, 24 are linked and rotated between the initial position where the connection of the housing 10 and the mating housing 40 is started and the connection position where the connection of the housing 10 and the mating housing 40 is completed. When the virtual line V passing through the second shafts 27 and the coupling portions 28 with the second lever 24 located at the initial position is set, the first shafts 14 are arranged in the region closer to the connection position than the virtual line V.

According to the lever-type connector F of this embodiment, the operation force applied to the operating portion 20 is transmitted to the second shafts 27 via the coupling portions 28 and the second lever 24 to exhibit the boosting function in the process of rotating the first and second levers 18, 24 from the initial position to the connection position. Since the coupling portions 28 are relatively displaced from the side of the operating portion 20 toward the first shafts 14 along the guide portions 22 during this time, the operating portion 20 is displaced away from the second shafts 27. Therefore, an operation force necessary to rotate the second lever 24 can be small. Since the first and second levers 18, 24 need not be lengthened, the operation force can be reduced without enlargement.

The coupling portions 28 are arranged on the tip part of the second lever 24 on the side opposite to the second shafts 27 in the length direction. According to this configuration, the tip part of the second lever 24 does not project from the side edge of the first lever 18 in the process of linking and rotating the first and second levers 18, 24.

With the first and second levers 18, 24 located at the initial position, the coupling portions 28 are located on the operation side end parts 22A near the operating portion 20, out of the both end parts in the length direction of the guide portions 22. According to this configuration, if an attempt is made to rotate the both levers 18, 24 at the initial position toward a side opposite to the connection position, the coupling portions 28 butt against the operation side end parts 22A of the guide portions 22. In this way, it is possible to prevent the rotation of the both levers 18, 24 at the initial position toward the side opposite to the connection position.

The operating portion 20 is located on the tip part of the first lever 18 on the side opposite to the first shafts 14, out of the both end parts in the length direction of the first lever 18. The operation side end parts 22A on the side opposite to the first shafts 14, out of the both end parts in the length direction of the guide portions 22, are located adjacent to the operating portion 20. An adjacent direction of the operation side end parts 22A and the operating portion 20 is the length direction of the first lever 18, i.e. a direction connecting the first shafts 14 and the operating portion 20. According to this configuration, when the both levers 18, 24 are at the initial position, a projecting dimension of the tip part of the first lever 18 from the side edge of the second lever 24 can be shortened.

When the connection resistance generated in the connection process of the housing 10 and the mating housing 40 is maximum, the coupling portions 28 are located on straight lines connecting the first shafts 14 and the second shafts 27. According to this configuration, the direction of the operation force applied to the operating portion 20 to rotate the first lever 18 about the first shafts 14 coincides with the rotating direction of the second lever 24 about the second shafts 27. Therefore, the operation force applied to the operating portion 20 is exhibited as a force for rotating the second lever 24 without any loss.

Other Embodiments

The present invention is not limited to the above described and illustrated embodiment and is represented by claims. The present invention is intended to include all changes in the scope of claims and in the meaning and scope of equivalents and also include the following embodiments.

Although the coupling portions are arranged on the tip part of the second lever in the above embodiment, the coupling portions may be arranged at positions closer to the second shafts than the tip part of the second lever.

Although the coupling portions are located on the operation side end parts of the guide portions when the both levers are at the initial position in the above embodiment, the coupling portions may be located closer to the first shafts than the operation side end parts of the guide portions when the both levers are at the initial position.

Although the operating portion is arranged on the tip part of the first lever in the above embodiment, the operating portion may be arranged at a position closer to the first shafts than the tip part of the first lever.

Although the operation side end parts of the guide portions are arranged adjacent to the operating portion in the above embodiment, the operation side end parts of the guide portions may be arranged at positions away from the operating portion.

Although the rotational force of the second lever is transmitted to the sliders and the cam grooves formed in the sliders exhibit the boosting function in the above embodiment, the second lever may be formed with cam grooves serving as the boosting portion.

Although the first shafts are located in the region closer to the connection position than the virtual line connecting the second shafts and the coupling portions with the both levers located between the initial position and the connection position in the above embodiment, the first shafts may be located in a region closer to the initial position than the virtual line before the both levers reach the connection position from the initial position.

LIST OF REFERENCE NUMERALS

10 . . . housing
11 . . . housing body
12 . . . wire cover
13 . . . guide groove
14 . . . first shaft
15 . . . bearing portion
16 . . . female terminal fitting
18 . . . first lever
19 . . . first arm portion
20 . . . operating portion
21 . . . bearing hole
22 . . . guide portion
22A . . . operation side end part
22B . . . shaft side end part
24 . . . second lever
25 . . . second arm portion
26 . . . linking portion
27 . . . second shaft
28 . . . coupling portion
29 . . . drive shaft
30 . . . slider
31 . . . passive recess
32 . . . cam groove (boosting portion)
40 . . . mating housing
42 . . . cam follower
43 . . . male terminal fitting
F . . . lever-type connector
M . . . mating connector
V . . . virtual line
θ . . . angle between first and second levers

What is claimed is:

1. A lever-type connector, comprising:
a housing;
a first lever mounted on the housing rotatably about a first shaft;
a second lever mounted on the housing rotatably about a second shaft in the same direction as the first lever; and
a boosting portion for exhibiting a boosting function by being linked with rotation of the second lever,
wherein:
the first lever includes a linearly extending guide portion extending from an operating portion of the first lever toward the first shaft,
the second lever includes a coupling portion coupled to the first lever relatively displaceably along the guide portion,
the first and second levers are linked and rotatable between an initial position where the first lever and the second lever are in a rearward leaning posture and connection of the housing and a mating housing is started and a connection position where the first lever and the second lever are in a forward leaning posture and the connection of the housing and the mating housing is completed, and
the first shaft is located closer to the connection position than a virtual line when the virtual line passing through the second shaft and the coupling portion with the second lever located at the initial position is set.

2. The lever-type connector of claim 1, wherein the coupling portion is arranged on a tip part of the second lever on a side opposite to the second shaft in a length direction.

3. The lever-type connector of claim 1, wherein the coupling portion is located on an operation side end part near the operating portion, out of both end parts in a length direction of the guide portion, with the first and second levers located at the initial position.

4. The lever-type connector of claim 1, wherein:
the operating portion is located on a tip part of the first lever on a side opposite to the first shaft, out of both end parts in a length direction, and
an operation side end part of the guide portion on a side opposite to the first shaft, out of both end parts in the length direction, is located adjacent to the operating portion.

5. The lever-type connector of claim 1, wherein the coupling portion is located on a straight line connecting the first shaft and the second shaft when a connection resistance generated in a connection process of the housing and the mating housing is maximum.

* * * * *